United States Patent
Arambepola et al.

(10) Patent No.: US 9,954,712 B1
(45) Date of Patent: Apr. 24, 2018

(54) BLIND DECODING IN ORTHOGONAL FREQUENCY DIVISION MULTIPLEXING (OFDM) COMMUNICATION SYSTEMS

(71) Applicant: Intel Corporation, Santa Clara, CA (US)

(72) Inventors: Bernard Arambepola, Enfield (GB); Thushara Hewavithana, Hatfield (GB); Sahan S. Gamage, Cambridge (GB); Shaul Shulman, Ramat Gan (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/639,528

(22) Filed: Jun. 30, 2017

Related U.S. Application Data

(60) Provisional application No. 62/524,012, filed on Jun. 23, 2017.

(51) Int. Cl.
*H04B 1/10* (2006.01)
*H04L 27/26* (2006.01)
*H04L 5/00* (2006.01)

(52) U.S. Cl.
CPC ........ *H04L 27/2649* (2013.01); *H04L 5/0048* (2013.01); *H04L 27/2678* (2013.01)

(58) Field of Classification Search
CPC .......... H04L 27/2657; H04L 2027/003; H04L 2027/0065; H04L 27/2332; H04L 27/0014; H04L 25/03038; H04L 27/2647; H04L 2025/03414; H04L 25/03057; H04L 25/03343; H04L 25/497; H04L 7/033; H04L 7/04; H04L 7/08; H04L 7/041; H04L 7/042; H04B 1/1036; H04B 3/32; H04B 3/23
USPC ................. 375/259–285, 316–352, 354–376
See application file for complete search history.

(56) References Cited

U.S. PATENT DOCUMENTS

| | | | | |
|---|---|---|---|---|
| 6,791,995 B1 * | 9/2004 | Azenkot | ................ | H04B 1/707 348/E5.008 |
| 7,203,227 B1 * | 4/2007 | Currivan | ............. | H04L 12/2801 375/222 |
| 8,085,859 B2 * | 12/2011 | Guo | .................... | H04L 25/0242 375/260 |
| 8,446,990 B2 * | 5/2013 | Liu | ...................... | H04L 25/0212 375/259 |
| 8,498,363 B2 * | 7/2013 | Van Nee | .................. | H04B 7/01 375/296 |
| 8,571,086 B2 * | 10/2013 | Forenza | ................. | H04B 7/024 370/278 |
| 9,306,789 B2 * | 4/2016 | Dhayni | ............... | H04L 27/2657 |
| 9,325,554 B2 * | 4/2016 | Yokokawa | .......... | H04L 25/0232 |
| 9,702,965 B2 * | 7/2017 | Horvat | .................. | G01S 5/0294 |
| 9,768,884 B2 * | 9/2017 | Shan | .................. | H04B 10/6161 |

(Continued)

*Primary Examiner* — James M Perez
(74) *Attorney, Agent, or Firm* — Eschweiler & Potashnik, LLC

(57) ABSTRACT

Methods and architectures for blind detection of physical layer control (PLC) signaling for transmitters and receivers having respective misaligned inverse fast Fourier transforms (IFFTs) and (FFTs) includes opening a frequency tracking offset calibration circuit, estimating or calculating a phase discontinuity due to FFT misalignment, closing the frequency tracking offset calibration circuit and applying a frequency correction that includes a frequency offset less the calculated or estimated phase discontinuity.

14 Claims, 5 Drawing Sheets

(56) References Cited

U.S. PATENT DOCUMENTS

| | | | | |
|---|---|---|---|---|
| 9,826,537 B2* | 11/2017 | Forenza | | H04W 72/085 |
| 2002/0061012 A1* | 5/2002 | Thi | | H04B 3/23 |
| | | | | 370/352 |
| 2003/0021365 A1* | 1/2003 | Min | | H04L 1/0001 |
| | | | | 375/343 |
| 2004/0190544 A1* | 9/2004 | Azenko | | H04L 12/2801 |
| | | | | 370/442 |
| 2004/0210940 A1* | 10/2004 | Shah | | H03J 1/0075 |
| | | | | 725/111 |
| 2005/0084042 A1* | 4/2005 | Van Houtum | | H04L 27/2657 |
| | | | | 375/346 |
| 2005/0128987 A1* | 6/2005 | Liang | | H04W 52/0225 |
| | | | | 370/338 |
| 2005/0157820 A1* | 7/2005 | Wongwirawat | | H04L 25/0307 |
| | | | | 375/326 |
| 2005/0168382 A1* | 8/2005 | Awata | | G01S 19/29 |
| | | | | 342/357.68 |
| 2006/0088056 A1* | 4/2006 | Quigley | | H04J 3/0682 |
| | | | | 370/468 |
| 2007/0105520 A1* | 5/2007 | Van Houtum | | H04B 1/7087 |
| | | | | 455/296 |
| 2007/0237274 A1* | 10/2007 | Nakache | | H04L 27/2657 |
| | | | | 375/355 |
| 2008/0130790 A1* | 6/2008 | Forenza | | H04B 7/0452 |
| | | | | 375/299 |
| 2009/0086841 A1* | 4/2009 | Guo | | H04L 25/0242 |
| | | | | 375/267 |
| 2009/0141839 A1* | 6/2009 | Koh | | H04B 17/0085 |
| | | | | 375/345 |
| 2009/0274112 A1* | 11/2009 | Ma | | H04L 1/06 |
| | | | | 370/330 |
| 2011/0185263 A1* | 7/2011 | Chapman | | H04L 12/2801 |
| | | | | 714/776 |
| 2012/0106678 A1* | 5/2012 | Currivan | | H04L 27/0014 |
| | | | | 375/320 |
| 2012/0121049 A1* | 5/2012 | Al-Banna | | H04L 7/0029 |
| | | | | 375/354 |
| 2013/0022097 A1* | 1/2013 | Hewavithana | | H04L 25/022 |
| | | | | 375/232 |
| 2013/0324112 A1* | 12/2013 | Jechoux | | H04W 88/06 |
| | | | | 455/426.1 |
| 2014/0233679 A1* | 8/2014 | Rajagopal | | H04L 27/2649 |
| | | | | 375/340 |
| 2015/0098534 A1* | 4/2015 | Meller | | H04B 1/10 |
| | | | | 375/350 |
| 2015/0110492 A1* | 4/2015 | Yu | | H04L 27/18 |
| | | | | 398/79 |
| 2015/0215884 A1* | 7/2015 | Horvat | | G01S 5/0294 |
| | | | | 370/328 |
| 2015/0270921 A1* | 9/2015 | Jia | | H04B 10/6165 |
| | | | | 398/25 |
| 2017/0180063 A1* | 6/2017 | Berscheid | | H04B 17/309 |
| 2017/0215162 A1* | 7/2017 | Lee | | H04W 56/0005 |
| 2017/0222775 A1* | 8/2017 | Coomans | | H04L 5/0032 |
| 2017/0272184 A1* | 9/2017 | Zinevich | | H04B 17/345 |
| 2017/0324541 A1* | 11/2017 | Bae | | H04L 7/06 |

* cited by examiner

BLIND DECODING IN ORTHOGONAL FREQUENCY DIVISION MULTIPLEXING (OFDM) COMMUNICATION SYSTEMS

CROSS-REFERENCE TO RELATED APPLICATIONS

This application claims benefit of priority under 35 U.S.C. 119(e) to application Ser. No. 62/524,012 filed on Jun. 23, 2017, under the same title and inventorship, and which is fully incorporated herein by its reference.

FIELD

Embodiments of the present invention relate generally to communications, and more particularly, but not limited to, orthogonal frequency division multiplexing (OFDM) communications and architectures and methods for decoding received signals without knowing location of physical layer protocol signaling information within a received signal.

BACKGROUND

Certain communication systems use orthogonal frequency division multiplexing (OFDM), sometimes referred to as discrete multi-tone (DMT) transmission, such as those defined by Data Over Cable Service Interface Specification (DOCSIS) 3.1, although the inventive embodiments are not limited to any specific defined protocols.

OFDM is a frequency-division multiplexing (FDM) scheme used as a digital multi-carrier modulation method. A large number of closely spaced orthogonal sub-carrier signals are used to carry information on several parallel data streams or channels. Each sub-carrier is modulated with a conventional modulation scheme (such as quadrature amplitude modulation (QAM) or phase-shift keying (PSK) at a low symbol rate, maintaining total data rates similar to conventional single-carrier modulation schemes in the same bandwidth.

Physical layer (PHY) signaling information is often embedded within the OFDM signal so a receiver can understand the properties of the received signal and be able to properly demodulate and decode the received signal.

For example, in DOCSIS 3.1, PHY signaling information is carried by a narrow in-band channel known as the Physical Layer Link Channel (PLC). A receiver receiving an OFDM signal needs to decode the PLC channel initially and using that information, the receiver may properly decode the main channel carrying data and other signaling components. Unless predetermined, until the PLC is decoded, the receiver has no knowledge of the frequency location of the PLC or other OFDM channel conditions used by the transmitter.

In certain systems like DOCSIS 3.1, a receiver has to apply its OFDM FFT to decode the PLC without necessarily having any knowledge of its positioning by the transmitter IFFT. This is referred to herein as "blind decoding." In blind decoding, the transmitter IFFT and the receiver FFT will usually not be aligned in frequency during PLC decoding which may give rise to phase discontinuity between successive symbols in a received OFDM signal, and hence an additional algorithm is needed for PLC decoding. The PLC could be pre-determinately located in specific locations in frequency for a receiver to not experience this discontinuity, but that may require standardization or that different manufacturers or service providers to collaborate on a pre-existing configuration to do so first, which is not always possible or desirable. Thus there is a need to be able to "blindly" decode the PLC reliably, regardless of its frequency location by a transmitting device.

BRIEF DESCRIPTION OF THE DRAWING FIGURES

Certain circuits, logic operation, apparatuses and/or methods will be described by way of non-limiting example only, in reference to the appended Drawing Figures in which.

DETAILED DESCRIPTION OF THE INVENTION

While reference to example embodiments of the invention may be made to cable modems and related specifications, such as DOCSIS® 3.1 by Cable Television Laboratories, Inc., the blind decoding of PHY signaling information techniques of the inventive embodiments are not limited thereto and may be used in any protocols, applications or architectures where similar principles may be applied and their use provides similar advantages. Thus the specific description herein is provided only in context of one example implementation and the claims within are in no way limited thereby.

Figure 1:
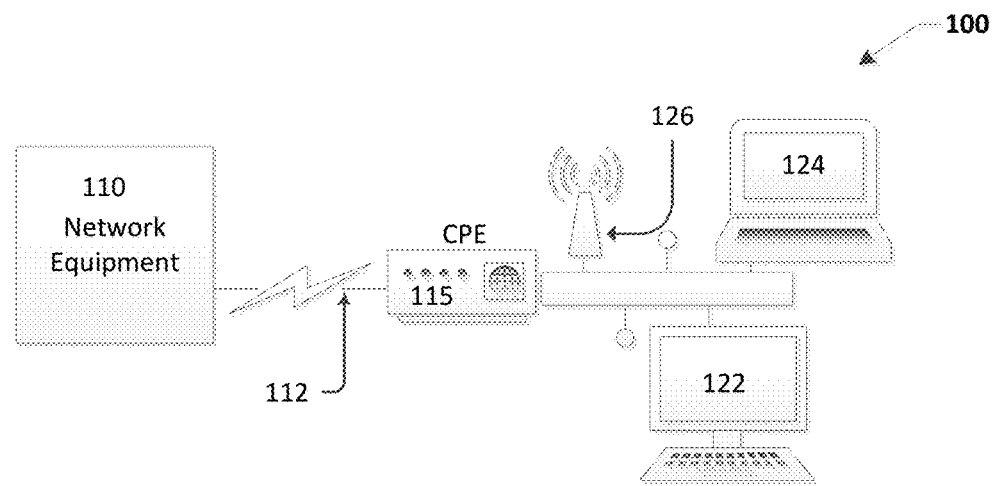
FIG. 1 shows a basic network diagram in which example embodiments of the invention may be utilized.

Turning to FIG. 1, a basic network 100 is shown with a network node 110, such as a cable provider Cable Modem Termination System (CMTS) or Internet service provider, which provides web access via an internet protocol (IP) interface to end user terminals 122, 124 such as personal computers, laptops, wireless access points, via a network connection 112, such as a combination of optical fiber from a service provider head end to an exchange terminal, transformed from optical to electrical signals and delivered to end users, generally over a coaxial cable though inventive embodiments are in no way limited to any particular network configuration. In order to receive, demodulate, and access signals from network node 110 in the downstream via connection 112, end user terminals 122, 124, 126 may require customer premise equipment (CPE) such as a cable modem (CM) 115.

DOCSIS 3.1 cable modems use OFDM to provide higher bandwidths and more robust transmissions than prior DOCSIS versions. In OFDM, source data is mapped onto all subcarriers (modulated or not) transmitted simultaneous in time but spread over frequencies are called an OFDM symbol. The transmitter applies an inverse fast Fourier transform (IFFT) to N orthogonal subcarriers (some QAM modulated w/ data, some not-called pilot subcarriers) to generate an OFDM symbol (an OFDM waveform) which is a summation of N orthogonal subcarrier sinusoids for transmission. The receiver uses an opposite FFT to transform the symbol back into N subcarriers that can be demodulated/de-mapped and decoded. In transmitting, these symbols are intentionally broken apart slightly in time with non-data subcarriers called a guard interval or a cyclic prefix (CP) to reduce inter-symbol interference in transmissions.

There are two types of pilot subcarriers used in the downstream, a continuous pilot carrier (also sometimes denoted as CP, although as this abbreviation is used hereinafter throughout this disclosure, CP is intended solely in reference to the cyclic prefix or guard interval between successive OFDM symbols) and a scattered pilot subcarrier (SP). Continuous pilots are transmitted at fixed subcarrier positions without modulation for receiver frequency and phase synchronization and SPs are scattered throughout on unused subcarriers for ongoing channel estimation.

Only a few subcarriers of the main OFDM channel are used to carry PHY signaling information about the OFDM signal being received. As mentioned previously, this is called the Physical Layer Link Channel (PLC) or Physical Layer signaling Channel, and it is always surrounded by 8 continuous pilot subcarriers to assist a receiver in locating it. Until it does, cable modem 115 may have no knowledge of the OFDM channel structure from network node 110 because of the various options the transmitter may select from such as varied channel size, number of subcarriers, number of OFDM channels, varied FFT sizes and subcarrier spacing, e.g., 4K mode=50 kHz or 8K mode=25 kHz. Hence it is required to locate and decode the PLC to identify the OFDM channel structure used by the network provider equipment 110. The information in the PLC can then be used to properly demodulate and decode the data carried by the full OFDM signal. Thus a blind PLC acquisition precedes a normal channel acquisition in CPE 115/receiver.

In blind acquisition the receiver has to first work out the FFT and cyclic prefix size of the OFDM transmission and then determine the subcarrier frequency location of the PLC and decode it. This requires synchronization of the receiver, extract the PLC subcarriers and then decode the signaling data communicated by those subcarriers.

Figure 2:
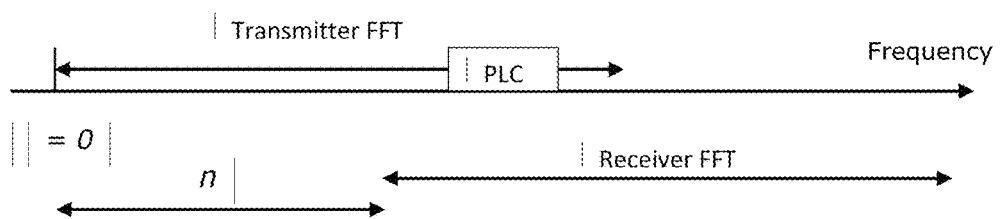
FIG. 2 shows a frequency chart of OFDM signal reception according to various embodiments of the invention.

One of the primary challenges of blind PLC decoding is having proper alignment of the FFT in the receiver without prior knowledge of the inverse FFT (IFFT) used by the transmitter, as illustrated in FIG. 2. Therefore, there will often be a displacement in frequency between the transmit IFFT and receive FFT, referred to herein as FFT "phase discontinuity." A visual example of this displacement is denoted in FIG. 2 by parameter (n). The value of n is not known to the receiver at this point of the acquisition process because the receiver has no advance knowledge of the frequency corresponding to subcarrier index k=0 in the OFDM IFFT used by the transmitter even though during initial acquisition the receiver has determined the proper FFT and CP sizes used by the transmitter. Only after decoding the PLC does the receiver know the frequency of subcarrier k=0. Then the receiver FFT can be aligned with the transmitter FFT to decode the data in the remainder of subcarriers. In order to do all this the receiver must first reliably demodulate and decode the PLC.

This displacement n gives rise to a phase discontinuity in the receiver between successive OFDM symbols. This discontinuity is given by Equation (1) as:

$$\text{phase\_discontinuity} = \frac{2\pi \, n \, \text{CP\_Size}}{\text{FFT\_Size}} \quad (1)$$

Where CP_size is the length of the cyclic prefix of the OFDM transmission. Use of cyclic prefix (CP) is a key element of enabling the OFDM signal to operate reliably. The cyclic prefix acts as a buffer region or guard interval to protect the OFDM signals from inter-symbol interference as previously mentioned. The above phase discontinuity is tabulated below Table 1, for all OFDM FFT and CP sizes used in the example of DOCSIS 3.1 downstream.

TABLE 1

Phase discontinuities for DOCSIS 3.1 D/S FFT & CP sizes

| CP size | 4K FFT | 8K FFT |
|---|---|---|
| 192 | $\dfrac{3*2\pi*n}{64}$ | $\dfrac{3*2\pi*n}{128}$ |
| 256 | $\dfrac{4*2\pi*n}{64}$ | $\dfrac{4*2\pi*n}{128}$ |
| 512 | $\dfrac{8*2\pi*n}{64}$ | $\dfrac{8*2\pi*n}{128}$ |
| 768 | $\dfrac{12*2\pi*n}{64}$ | $\dfrac{12*2\pi*n}{128}$ |
| 1024 | $\dfrac{16*2\pi*n}{64}$ | $\dfrac{16*2\pi*n}{128}$ |

In OFDM receivers the phase angles of pilot subcarriers are used for frequency and timing synchronization. In Equation (2) below, we assume that there is a pilot at subcarrier m. Then the frequency error may be taken as being proportional to:

$$\text{frequency\_error} \propto \Phi_m(\text{symbol } L) - \Phi_m(\text{symbol}(L-1)) \quad (2)$$

Here $\varphi_m$ is the phase angle (in radians) of the pilot at subcarrier location m. If the difference of this phase angle between successive symbols is calculated, one generally gets a value that is proportional to the frequency error.

Figure 3:
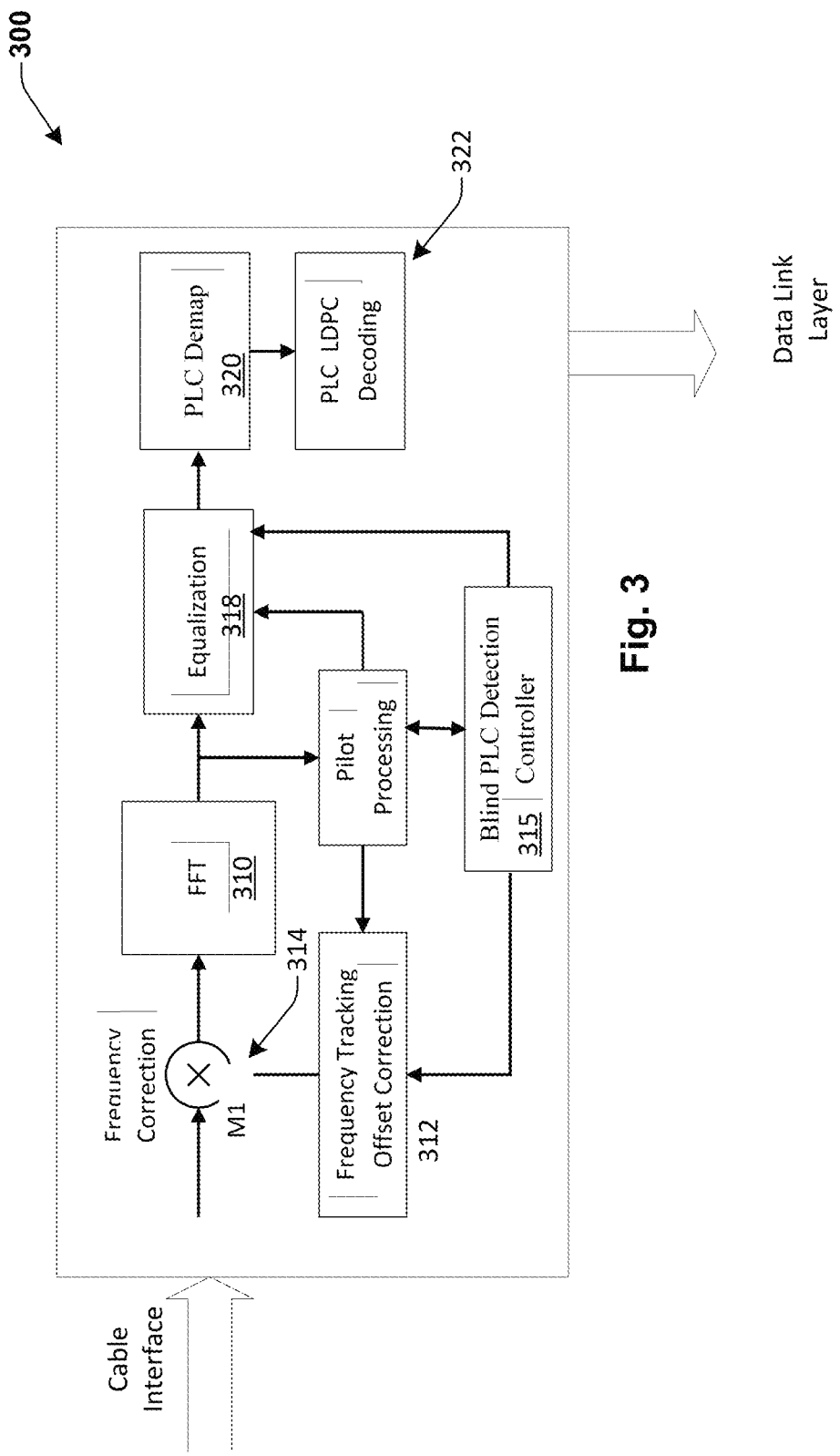
FIG. 3 shows a simplified block diagram of an OFDM receiver according to one or more embodiments of the invention.

Referring to FIG. 3, this calculated frequency error is fed back to the digital front end of the receiver 300 to correct for this frequency offset prior to the FFT 310. This may be done via a frequency tracking feedback loop 312, 314 as shown in FIG. 3

This frequency offset correction is used by OFDM receivers to properly synchronize the incoming signal. However, this frequency tracking and correction may be severely problematic when there is a phase discontinuity between successive symbols due to the misalignment of IFFT from the transmitter and FFT at the receiver as shown in FIG. 2. When this is the case, the phase difference in the right hand side of equation (2) above will be dominated by the component due to the FFT displacement (n in FIG. 1) rather than the less significant synchronization adjustments it is designed to offset. For example, if we take the FFT size as 4K and the CP size as 256 (Table 1), then the FFT misalignment will give the result:

$$\phi_m(\text{symbol } L) - \phi_m(\text{symbol}(L-1)) = \frac{4*2\pi*n}{64}$$

If this misalignment between FFTs, i.e., phase discontinuity, is treated like the phase difference due to typical frequency offset, then the frequency tracking circuit 312, 314 of FIG. 3 will make the following frequency correction for this phase difference equal to zero.

$$\Delta f = \Delta f_{sub\_car} \frac{n \text{ CP\_size}}{(\text{FFT\_size} + \text{CP\_size})} \quad (4)$$

where $\Delta f_{sub\_car}$ is the OFDM subcarrier spacing.

Applying this frequency correction by mixer (M1) 314 in FIG. 3 would clearly result in problematic and improper correction as the receiver has adjusted its frequency to correct for phase differences, not caused by a frequency error, but caused by an unavoidable and unknown misalignment of FFTs between the transmitter and receiver 300. As a result the PLC subcarriers will not be decodable and without the information in the PLC, the entire OFDM signal will be improperly received and likely cause receiver 300 and/or the modem it resides in to lock up for phase jumping. Accordingly, a blind PLC detection circuit 315 which interfaces with various components of receiver 300 to perform any of the example blind PLC decoding methods described below is included to alleviate receiver phase jumping and/or lock up.

Figure 4:
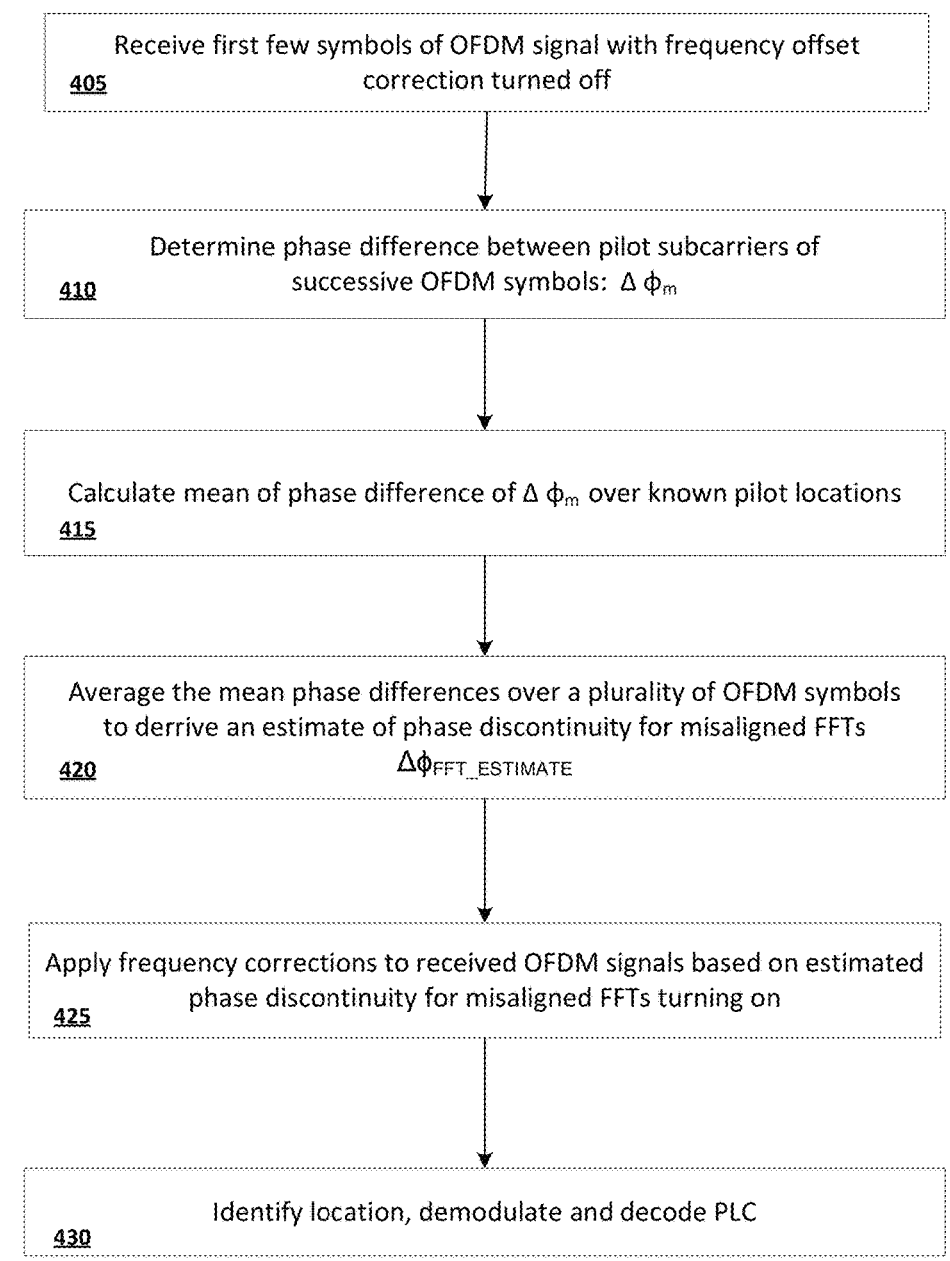
FIG. 4 shows one example method of blind decoding physical layer control signaling information according to one or more embodiments.

Turning to FIG. 4, according to certain embodiments of the invention a method 400 for blind decoding of OFDM signals in a receiver is disclosed which alleviates the problematic blind decoding previously discussed.

In general, a method 400 for blind decoding a PLC may include a receiver receiving 405 a first plurality of OFDM symbols in a received signal with the receiver frequency tracking and offset correction turned off by blind PLC detection controller/circuit (315; FIG. 3). Next, the PLC detection controller determines 410, the phase difference $\Delta\varphi_m$ of pilot subcarriers between successive symbols for each pilot location m in radians. Method 400 continues by calculating 415 the mean of the phase differences determined from step 410 for all known pilot subcarrier locations.

In order to reduce random noise errors, method 400 preferably further includes averaging 420 the mean phase differences from step 415 over several successive symbols to derive an estimate value for phase differences due to FFT misalignment, $\Delta\varphi_{FFT\_ESTIMATE}$.

Now an estimated value is derived of phase discontinuity due to the FFTs being misaligned between transmitter and receiver, the receiver PLC detection controller turns on the frequency offset correction circuit and can apply 425 a frequency correction $\Delta f$ to correct frequency offset based on actual frequency error and not the displacement (n) due to FFT misalignment. This frequency correction being approximate to the phase difference between pilots determined in step 405 less the value of phase difference due to FFT misalignments estimated at step 420 or $\Delta f = \Delta\varphi_m - \Delta\varphi_{FFT\_ESTIMATE}$.

Once the correct frequency tracking offset correction has been applied, the problem of phase jumping based on frequency tracking and offset correction loop (e.g. 312 in FIG. 3) encountering FFT misalignment will function properly. However, there may still be problems encountered in phase jumping at the FFT (310, FIG. 3) which may give rise to channel equalization issues. Accordingly, the estimated phase discontinuity determined at step 420 can be applied to the channel equalization (318; FIG. 3).

Once frequency corrections have been applied 425, the PLC can be located 430 (e.g., by the 8 continuous pilot subcarriers surrounding it), QAM de-mapped into soft bits and low density parity check (LDPC) decoding performed (320, 322 FIG. 3) to recover the PHY parameters needed to properly demomdulate/decode and extract the data in the remainder of the OFDM channel from the transmitter.

Although this algorithm has been described with reference to DOCSIS 3.1 for cable signal demodulation, it is applicable to be used in any OFDM application where frequency offset corrections experience issues due to unknown, potentially misaligned transmitter and receiver OFDM FFTs. Hence it may be used in the physical layer of numerous other OFDM-based communication receivers where similar issues may be encountered for blind detection of physical layer signaling information.

Figure 5:
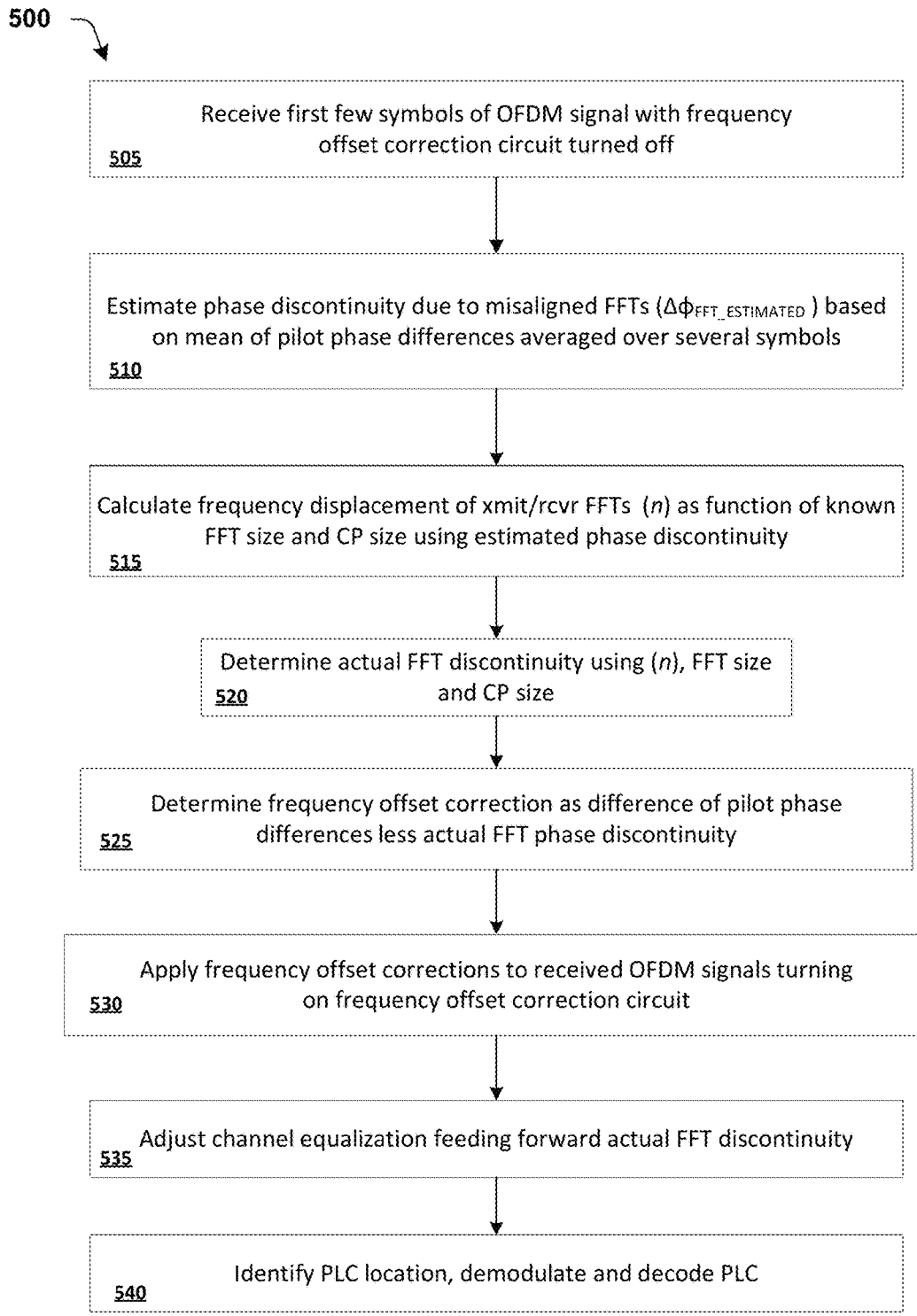
FIG. 5 shows another method of blind decoding physical layer control signaling information according to the inventive embodiments.

In another embodiment of the present invention, with reference to FIG. 5, a method 500 for blind decoding OFDM signals is disclosed which provides an increased accuracy of determining misalignment of xmt/rcv FFTs will be described.

As before, the receiver receives 505 an OFDM signal, but without initially correcting for the frequency errors, i.e. leave the frequency tracking loop(s) open. The phase difference between pilots of successive symbols may be calculated (Equation (5)) and the mean phase difference determined over one symbol period (Equation (6)). Then average the mean values of phase differences over several successive symbols to further reduce error, similarly in respect to the prior method 400 of FIG. 4, to estimate 510 the phase discontinuity due to FFT misalignment ($\Delta\varphi_{FFT\_ESTIMATE}$).

$$\Delta\phi_m = \phi_m(\text{symbol } L) - \phi_m(\text{symbol}(L-1)) \quad (5)$$

$$\overline{\Delta\phi} = \frac{1}{\text{number\_of\_pilots}} \sum_{m \in Pilot\_set} \Delta\phi_m \quad (6)$$

Note, for DOCSIS 3.1 OFDM downstream these may be limited to the 8 continuous pilots within the 6 MHz band containing the PLC. The FFT size and Cyclic Prefix size are known by this time due to channel acquisition process. Hence from the potential values calculated in Table 1, the precise value of the FFT phase discontinuity $\Delta\varphi_{FFT\_ACTUAL}$ as a function of the FFT displacement (n) in frequency (FIG. 2) may be determined (recall the phase discontinuity is determined in radians measuring the phase angles of the pilots). As one example let the FFT size be 4K and CP size be 256. Then, from Table 1, we have:

$$\Delta\phi_{FFT\_ACTUAL} = \frac{4 * 2\pi * n}{64} = \frac{\pi n}{8} \quad (7)$$

Let $\Delta\varphi_{FFT\_ACTUAL}$ be in the range (0, 2π). However, since n is an unknown we do not know $\Delta\Phi_{FFT\_ACTUAL}$. But we now have an estimate of this in $\Delta\varphi_{FFT\_ESTIMATE}$. From this estimate we can calculate 515 the value of n in the expression for the actual phase difference (Equation (7) above by the following:

$$n_1 = \text{round}\left(\frac{8\Delta\phi}{\pi}\right) \quad (8)$$

The above equation does not give the precise value of n, but $n_1 = n$ modulo 16, which is sufficient to determine the actual value of the phase discontinuity from Equation (7).

Furthermore, in the above equation we have implicitly assumed that the phase difference due to frequency error is small. This is a valid and reliable assumption because much of the frequency errors have been corrected by this stage of processing, for example, through cyclic prefix correlation.

From this the precise value phase offset as due to FFT misalignment in the transmitter and the receiver can be determined 520 from Equation (9):

$$\Delta\phi_{FFT\_ACTUAL\_COMP} = \frac{\pi n_1}{8} \quad (9)$$

Note that the above equation is valid for the case of a 4K FFT with CP size 256. For example embodiments using givens from DOCSIS 3.1, the remaining nine FFT and CP size combinations in the expressions in Table 1 above the actual phase continuities for FFTs of all cases can be similarly computed. For example, let the FFT size be 4K and the CP size 1024, the example inventive embodiment for this DOCSIS 3.1 scenario would work through as:

$$\Delta\phi_{FFT\_ACTUAL} = \frac{16*2\pi*n}{64} = \frac{\pi n}{2}$$

$$n_1 (= n \text{ modulo } 4) = \text{round}\left(\frac{2\Delta\phi}{\pi}\right)$$

$$\Delta\phi_{FFT\_ACTUAL\_COMP} = \frac{\pi n1}{2}$$

And similarly with the remaining eight combinations of FFT and CP sizes from Table 1. Now, since the value of phase difference due to FFT misalignment ($\Delta\phi_{FFT\_ACTUAL\_COMP}$) has been determined, the accurate frequency error Δf needed by the frequency tracking feedback loop (312 FIG. 3) can be determined 525 as:

frequency_error∝Φ$_m$(symbol L)−Φ$_m$(symbol(L−1))−
    Δϕ$_{FFT\_ACTUAL\_COMP}$ Which is Equation (2) less Equation (9). At this point, the tracking loop may be closed (i.e., an offset correction applied to mixer 314 shown in FIG. 3), is applied 530 to the signal prior to the FFT and proceed to decode the PLC, which may involve channel equalization 315, de-mapping 320 and LDPC decoding 322, as shown in FIG. 3.

Implementing the foregoing embodiments will avoid the "phase jump" that causes issues by the frequency tracking loop. However, there may still occur phase jump from OFDM symbol to symbol observed at the output of FFT. This phase jump may compensated as part of equalization process in certain embodiments. To implement an equalization phase jump correction, φ, for a given symbol L is related phase jump correction for symbol L−1, as:

$$\Phi(L)=\Phi(L-1)+\Delta\Phi_{FFT\_ACTUAL\_COMP} \quad (10)$$

Conventionally, the channel equalization process involves correction for channel estimate and any feed forward correction of slow varying phase (due to phase noise, for example). In addition to this, certain embodiments of the present invention may include a feed forward 535 phase jump correction to deal with phase jump by utilizing the computed FFT phase discontinuity already known, with the relationship given in equation (10). Finally, we can identify 540 the PLC field and proceed to decode the equalized PLC data. This may involve PLC de-mapping 320 into soft bits and LDPC decoding 322, as shown in FIG. 3.

The foregoing description of architecture and processing may be implemented as a system on a chip (SoC) receiver for cable modems using DOCSIS 3.1 Hybrid Fiber Coax standard although not limited thereto. Specific hardware and software implementations for functional block blind PLC decoding elements discussed herein, (e.g., 315, FIG. 3; 605, FIG. 6) may include designs in application specific integrated circuits (ASICs), micro-controllers, programmable logic arrays, and/or as software/firmware to perform the processes described herein. In one example embodiments, the frequency offset calculations may be programmed in software instructions and executed by the processor, or central processing unit (CPU) attached to the hardware demodulator.

Figure 6:
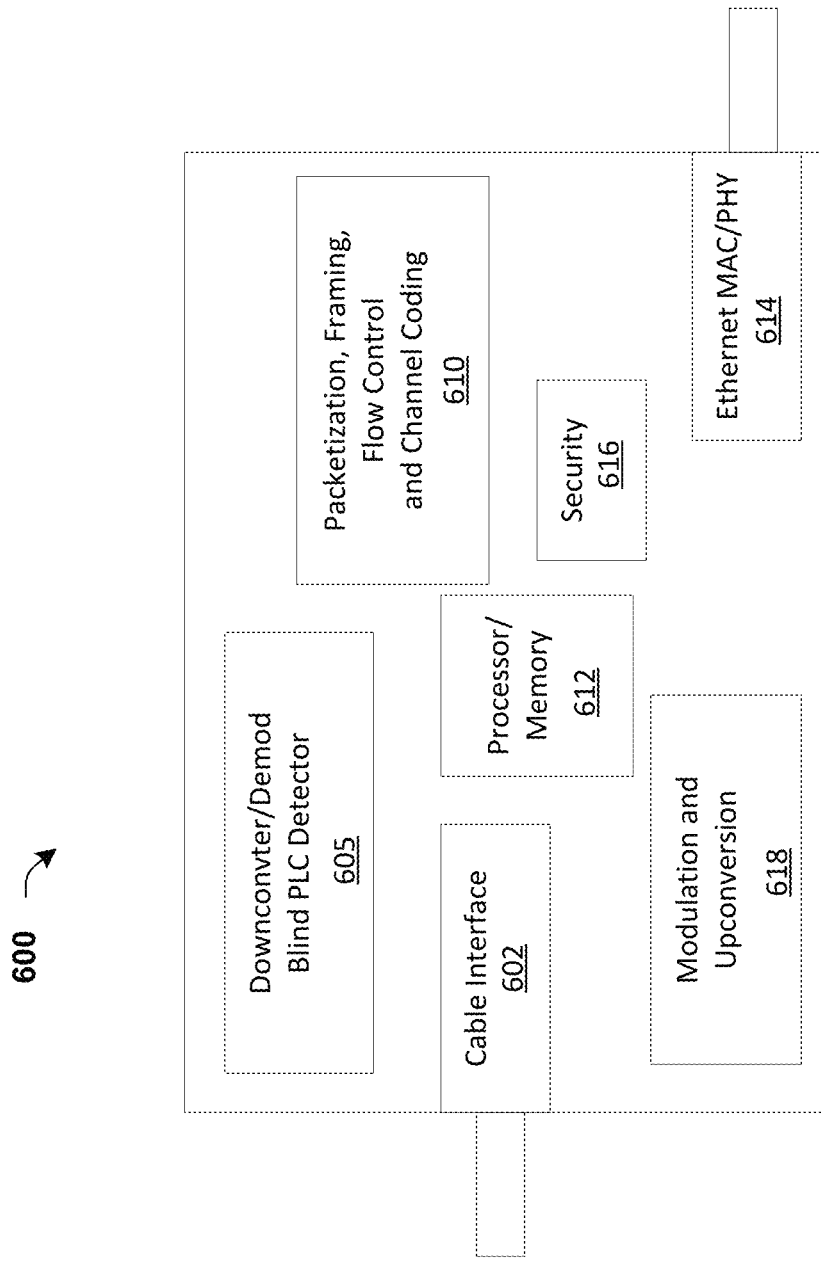
FIG. 6 shows an example functional block diagram of a modem including a blind PLC decoding OFDM receiver of one or more embodiments of the invention.

Referring to FIG. 6, an example functional block diagram of a modem 600 for blind detection of PLC information in received OFDM signals may include a receive interface 602 adapted to receive a wired or wireless OFDM signal into the modem, a downconverter/demodulator/de-coder circuit 605 having blind PLC detection capabilities as described herein, such as device 300 in FIG. 3, and a modulator/upconverter circuit 618 for sending signals upstream via any type of desired PHY layer protocols.

In certain example embodiments, modem 600 may further include various other functional elements such as communications management circuit 610 to construct or de construct packetization, framing, manage flow control and channel coding/decoding of incoming or outgoing communication protocols as suitable for unidirectional or bi-directional data communication with the PHY layer or higher layer levels of the OSI communications model, a processor/memory 612 adapted to control or provide processing/storage for various other functional elements of modem 600 as desired. Furthermore, modem 600 may include security functionality 616 and client/user interface functionality 614, such as 10 gb based Ethernet PHY/MAC processing and respective interface(s) to provide a user TCP/IP layer interface connectivity. It should be understood that modem 600 is only a representational functional example and various additional functionalities may be included as desired or those functionalities shown omitted if not needed or desired as known by one of ordinary skill in the art. Thus the specific example depicted and described is not intended to limit the embodiments of the invention in any manner.

DOCSIS 3.1 has been engineered by CableLabs to unleash the multi-gigabit data era on existing Hybrid Fibre-Coax (HFC) networks through improved spectral efficiency using OFDM multi-carrier modulation combined with low-density parity-check-based Forward Error Correction. DOCSIS 3.1 specification, including two 196 MHz OFDM downstream channels, 32 single-carrier DOCSIS 3.0 QAM downstream channels, two 96 MHz OFDM-A upstream channels and eight single-carrier DOCSIS 3.0 QAM upstream channels. Data-Over-Cable Service Interface Specifications (DOCSIS® 3.1) Physical Layer Specification CM-SP-PHYv3.1-I01-131029 available at https://community.cablelabs.com/.

Now various example embodiments will be described:

In an Example 1, a communication device is described for blind decoding of an incoming orthogonal frequency division multiplexing (OFDM) signal, including a receiver circuit that comprises a frequency tracking offset circuit adapted to provide frequency corrections to the incoming OFDM signal due to frequency offset errors. Also, a blind physical layer control (PLC) detection circuit is coupled to the frequency tracking offset circuit and adapted to turn off the frequency tracking offset circuit for a first plurality of OFDM symbols of the incoming OFDM signal to determine a frequency displacement misalignment between a transmit inverse fast Fourier transform (iFFT) and a receive FFT and to turn on the frequency tracking offset circuit to apply frequency corrections excluding said frequency displacement.

An Example 2 that is based on Example 1 the blind PLC detection circuit determines said frequency displacement by calculating a phase discontinuity that is proportional to said frequency displacement and based, at least in part, on an estimated phase discontinuity including an average of a plurality of mean phase differences over all known pilot subcarriers in said first plurality of OFDM symbols, each mean phase difference determined from a plurality of phase differences between angles of pilot subcarriers of successive symbols of said first plurality of OFDM symbols.

An Example 3 that is based on Example 2, the communication device of claim 2 wherein said estimated phase discontinuity is represented mathematically as ($\Delta\varphi_{FFT\_ESTIMATED}$), said plurality of phase differences as ($\Delta\varphi$) between angles of each pilot subcarrier (m) of said successive symbols (L) and calculated by:

$$\Delta\phi_m = \phi_m(\text{symbol } L) - \phi_m(\text{symbol}(L-1))$$

and $\Delta\phi_{FFT\_ESTIMATED}$ is said average of:

$$\overline{\Delta\phi} = \frac{1}{\text{number\_of\_pilots}} \sum_{m \in Pilot\_set} \Delta\phi_m$$

An Example 4 that is based on Examples 1-3 the receiver is further includes a channel equalizer adapted to feed forward phase corrections, and wherein said blind PLC control detection circuit is coupled to said channel equalizer and further adapted to feed forward a phase adjustment based on the determined frequency displacement to said channel equalizer.

An Example 5 that is based on Examples 1-4 the blind PLC detection circuit determines said phase discontinuity based on the estimated phased discontinuity and a function of a size of said receive FFT and a cyclic prefix (CP) size of the incoming OFDM signal.

An Example 6 that is based on Examples 1-5 the receiver circuit further includes: a FFT circuit adapted to apply said receive FFT to a plurality of subcarriers containing PLC signaling information after said frequency corrections have been applied; a de-mapper configured to extract soft bits from said plurality of subcarriers containing PLC signaling information after the receive FFT has been applied; and a low density parity check (LDPC) decoder coupled to the de-mapper to decode said soft bits to derive the PLC signaling information.

An Example 7 that is based on Examples 1-6 wherein the communication device comprise a cable modem compliant with a Data Over Cable Service Interface Specification (DOCSIS) version 3.1 standard.

An Example 8 that is based on Examples 1-7, the receiver circuit is at least part of a system on a chip (SoC).

An Example 9 that is based on Examples 1-8, the size of said receive FFT and said size of said CP are part of a limited pre-defined set of two FFT sizes and 10 CP size combinations.

An Example 10, a method of blind decoding a physical link layer control (PLC) signal from an incoming orthogonal frequency division multiplexing (OFDM) signal includes: deactivating a frequency correction tracking loop during an initial plurality of symbols received from the incoming OFDM signal; calculating a frequency displacement between fast Fourier transforms (FFTs) used by a transmitter and a receiver; determining a frequency correction to be used by the frequency correction as an offset correction less the calculated frequency displacement; reactivating the frequency correction tracking loop to apply the frequency correction; and recovering the PLC signal after the frequency correction.

An Example 11 that is based on Example 10 wherein calculating the frequency displacement comprises: determining a phase difference of pilot subcarriers between successive symbols of the initial plurality of symbols; calculating the mean of the determined phase differences for every known pilot location over the initial plurality of symbols; averaging the calculated mean phase differences to derive an estimated phase discontinuity; and applying the estimated phase discontinuity, at least in part, to determine said frequency correction.

An Example 12 that is based on Examples 10 or 11 further includes: equalizing a channel of the incoming OFDM signal by adding a phase correction proportional to the calculated frequency displacement prior to recovering the PLC signal.

An Example 13 that is based on Examples 10-12 wherein calculating the frequency displacement includes calculating an actual phase discontinuity as a function of the estimated phase discontinuity, an FFT size and a cyclic prefix (CP) size of the incoming OFDM signal and applying the calculated actual phase discontinuity to determine said frequency correction instead of the estimated phase discontinuity.

An Example 14 is based on Examples 10-13 wherein the incoming OFDM signal is a cable modem transmission compliant with a Data Over Cable Service Interface Specification (DOCSIS) version 3.1 standard.

An Example 15 describes a cable modem for decoding an incoming orthogonal frequency division multiplexing (OFDM) signal having physical layer control (PLC) signaling in a location unknown to the cable modem, the cable modem includes: a blind PLC signal controller; a frequency offset correction circuit coupled to said blind PLC signal controller, and adapted to provide frequency corrections to the incoming OFDM signal; a fast Fourier transform (FFT) circuit configured to apply a receive FFT to the incoming OFDM signal; and a channel equalizer coupled to the FFT circuit and the blind PLC signal controller and adapted to provide phase corrections to the incoming OFDM signal. Also, the blind PLC signal controller is adapted to determine a phase discontinuity for misaligned transmit and receive FFTs and control said frequency corrections and said phase corrections to compensate for said phase discontinuity to enable detection and recovery of the PLC signaling without phase jumping.

An Example 16 is based on Example 15 wherein the blind PLC signal controller determines said phase discontinuity, at least in part, by estimating phase discontinuity based on phase differences between pilot subcarriers of a plurality of initial successive OFDM symbols while the frequency offset correction circuit is turned off.

An Example 17 is based on Example 16 wherein said processing phase differences includes determining an estimated phase discontinuity from an averaged mean of pilot phase angle differences per symbol of said plurality of initial successive OFDM symbols.

An Example 18 is based on Examples 15-17 wherein the phase discontinuity is determined based on the estimated phase discontinuity as a function of known FFT size and cyclic prefix (CP) size.

An Example 19 is based on Examples 15-17 wherein said frequency corrections are made by subtracting a frequency proportional to the determined phase discontinuity and wherein said phase corrections are made by adding a phase equal to the determined phase discontinuity.

An Example 20 is based on Examples 15-19 wherein the modem is compliant with a Data Over Cable Service Interface Specification (DOCSIS) version 3.1 standard.

Those of skill in the art would recognize modifications and substitutions of the elements, components and circuits described herein and possible and the invention is not limited to the specific examples in the detailed description but rather by the appended claims.

Disclaimer: The present disclosure has been described with reference to the attached drawing figures, with certain example terms and wherein like reference numerals are used to refer to like elements throughout. The illustrated structures, devices and methods are not intended to be drawn to scale, or as any specific circuit or any in any way other than as functional block diagrams to illustrate certain features, advantages and enabling disclosure of the inventive embodiments and their illustration and description is not intended to be limiting in any manner in respect to the appended claims that follow, with the exception of 35 USC 112, first paragraph claims using the literal words "means for," if present in a claim.

As utilized herein, the terms "component," "system," "interface," "logic," "circuit," "device," and the like are intended only to refer to a basic functional entity such as hardware, software (e.g., in execution), logic (circuits or programmable, firmware alone or in combination to suit the claimed functionalities. For example, a component, module, device or processing unit may mean a microprocessor, a controller, a programmable logic array and/or a circuit coupled thereto or other logic processing device, and a method or process may mean instructions running on a processor, firmware programmed in a controller, an object, an executable, a program, a storage device including instructions to be executed, a computer, a tablet PC and/or a mobile phone with a processing device.

By way of illustration, a process, logic, method or module can be any analog circuit, digital processing circuit or combination thereof. One or more circuits or modules can reside within a process, and a module can be localized as a physical circuit, a programmable array, a processor. Furthermore, elements, circuits, components, modules and processes/methods may be hardware or software, combined with a processor, executable from various computer readable storage media having executable instructions and/or data stored thereon. Those of ordinary skill in the art will recognize various ways to implement the logical descriptions of the appended claims and their interpretation should not be limited to any example or enabling description, depiction or layout described above, in the abstract or in the drawing figures.

The invention claimed is:

1. A communication device for blind decoding of an incoming orthogonal frequency division multiplexing (OFDM) signal, the communication device comprising:
a receiver circuit comprising:
a frequency tracking offset circuit adapted to provide frequency corrections to the incoming OFDM signal due to frequency offset errors; and
a blind physical layer control (PLC) detection circuit coupled to the frequency tracking offset circuit and adapted to turn off the frequency tracking offset circuit for a first plurality of OFDM symbols of the incoming OFDM signal to determine a frequency displacement misalignment between a transmit inverse fast Fourier transform (iFFT) and a receive FFT and to turn on the frequency tracking offset circuit to apply frequency corrections excluding said frequency displacement.

2. The communication device of claim 1 wherein the blind PLC detection circuit determines said frequency displacement by calculating a phase discontinuity that is proportional to said frequency displacement and based, at least in part, on an estimated phase discontinuity comprising an average of a plurality of mean phase differences over all known pilot subcarriers in said first plurality of OFDM symbols, each mean phase difference determined from a plurality of phase differences between angles of pilot subcarriers of successive symbols of said first plurality of OFDM symbols.

3. The communication device of claim 2 wherein said estimated phase discontinuity is represented mathematically as ($\Delta\varphi_{FFT\_ESTIMATED}$), said plurality of phase differences as ($\Delta\varphi$) between angles of each pilot subcarrier (m) of said successive symbols (L) and calculated by:

$$\Delta\Phi_m = \Phi m(\text{symbol } L) - \Phi_m(\text{symbol}(L-1))$$

and $\Delta\varphi_{FFT\_ESTIMATED}$ is said average of:

$$\overline{\Delta\phi} = \frac{1}{\text{number\_of\_pilots}} \sum_{m \in Pilot\_set} \Delta\phi_m$$

4. The communication device of claim 1 wherein said receiver further comprises:
a channel equalizer adapted to feed forward phase corrections, and wherein said blind PLC control detection circuit is coupled to said channel equalizer and further adapted to feed forward a phase adjustment based on the determined frequency displacement to said channel equalizer.

5. The communication device of claim 2 wherein said blind PLC detection circuit determines said phase discontinuity based on the estimated phased discontinuity and a function of a size of said receive FFT and a cyclic prefix (CP) size of the incoming OFDM signal.

6. The communication device of claim 4 wherein said receiver circuit further comprises:
a FFT circuit adapted to apply said receive FFT to a plurality of subcarriers containing PLC signaling information after said frequency corrections have been applied;
a de-mapper configured to extract soft bits from said plurality of subcarriers containing PLC signaling information after the receive FFT has been applied; and
a low density parity check (LDPC) decoder coupled to the de-mapper to decode said soft bits to derive the PLC signaling information.

7. The communication device of claim 1 wherein the communication device comprise a cable modem compliant with a Data Over Cable Service Interface Specification (DOCSIS) version 3.1 standard.

8. The communication device of claim 1 wherein the receiver circuit is at least part of a system on a chip (SoC).

9. The communication device of claim 5 wherein said size of said receive FFT and said size of said CP are part of a limited pre-defined set of two FFT sizes and 10 CP size combinations.

10. A method of blind decoding a physical link layer control (PLC) signal from an incoming orthogonal frequency division multiplexing (OFDM) signal, the method comprising:
 deactiviating a frequency correction tracking loop during an initial plurality of symbols received from the incoming OFDM signal;
 calculating a frequency displacement between fast Fourier transforms (FFTs) used by a transmitter and a receiver;
 determining a frequency correction to be used by the frequency correction as an offset correction less the calculated frequency displacement;
 reactivating the frequency correction tracking loop to apply the frequency correction; and
 recovering the PLC signal after the frequency correction.

11. The method of claim 10 wherein calculating the frequency displacement comprises:
 determining a phase difference of pilot subcarriers between successive symbols of the initial plurality of symbols;
 calculating the mean of the determined phase differences for every known pilot location over the initial plurality of symbols;
 averaging the calculated mean phase differences to derive an estimated phase discontinuity; and
 applying the estimated phase discontinuity, at least in part, to determine said frequency correction.

12. The method of claim 10 further comprising:
 equalizing a channel of the incoming OFDM signal by adding a phase correction proportional to the calculated frequency displacement prior to recovering the PLC signal.

13. The method of claim 11 wherein calculating the frequency displacement includes calculating an actual phase discontinuity as a function of the estimated phase discontinuity, an FFT size and a cyclic prefix (CP) size of the incoming OFDM signal and applying the calculated actual phase discontinuity to determine said frequency correction instead of the estimated phase discontinuity.

14. The method of claim 10 wherein the incoming OFDM signal is a cable modem transmission compliant with a Data Over Cable Service Interface Specification (DOCSIS) version 3.1 standard.

* * * * *